UNITED STATES PATENT OFFICE.

MARTHA R. KELLY, OF LAREDO, TEXAS.

CEREAL FOOD AND PROCESS OF PREPARING THE SAME.

1,395,831.     Specification of Letters Patent.     Patented Nov. 1, 1921.

No Drawing.     Application filed March 7, 1919. Serial No. 281,224.

*To all whom it may concern:*

Be it known that I, MARTHA R. KELLY, a citizen of the United States, residing at Laredo, in the county of Webb and State of Texas, have invented certain new and useful Improvements in Cereal Foods and Processes of Preparing the Same; and I do hereby declare the following to be a full, clear, and exact description of the invention, such as will enable others skilled in the art to which it appertains to make and use the same.

This invention relates to cereal foods and processes for preparing the same, and more particularly to a process by means of which a cereal may be readily treated so as to render the same palatable and easily digested.

The primary object of my invention is to provide a process by means of which corn or other grain may be readily treated so as to convert the starchy ingredients thereof into dextrin, the grain being thoroughly dried so as to remove excessive moisture so as to prevent fermentation.

A further object is to provide a cereal food of attractive and appetizing appearance which may be easily digested and which can be readily handled commercially.

Further objects will appear from the detailed description.

In carrying my invention into effect, the grain to be treated, such as corn or other suitable grain, is first ground so as to produce a relatively fine powder or meal which is composed of a great number of well defined relatively small particles or granules. The meal thus produced is then treated by a baking process so as to remove excess moisture and convert the starch into dextrin, the meal being thoroughly sterilized so as to effectually prevent fermentation, the product being capable of keeping in a sweet condition for an indefinite period. During the baking process, the meal is thoroughly stirred by any suitable means, the temperature being gradually raised so as to effectually drive off all excessive moisture and thoroughly bake or roast the individual particles of the meal thus insuring thorough drying and cooking thereof, the resultant product being a meal of a golden brown color which is composed of a great number of relatively small easily friable particles which are thoroughly cooked. This meal, after being thus prepared, is ready for immediate use and may be used as a cereal in the well known manner, or may be used for cooking purposes as the ingredient of a flour, or for any other purpose for which cereals of this sort are commonly employed. The temperature to which the meal is subjected during the baking process will depend, necessarily, upon the condition of the particular batch of meal undergoing treatment. In practice, the temperature is, to begin with, relatively low, being preferably below 212° Fahrenheit so as to prevent steaming of the meal. After the meal has been thoroughly dried, the temperature is gradually raised to 280° to 290° Fahrenheit, the stirring or agitating of the meal continuing during this treatment. This relatively high temperature to which the meal is raised after thorough drying thereof is maintained until the meal has been cooked to a light golden brown, the time required for this result depending, to a certain extent, upon the particular batch of meal undergoing treatment. After the meal has thus been thoroughly dried and cooked, it is then cooled by suitable means, care being taken to exclude moisture, the resulting product being ready for immediate use, or being placed in suitable containers for shipment.

As stated, the food which is thus produced has a very pleasant appetizing appearance and is of a slightly sweetish taste while being composed of readily friable particles which may be easily masticated and digested. Also, if desired, the readily friable particles formed by this process may be ground to provide a powder or flour which may be used for cooking purposes, or for any other purpose for which such flours are adapted.

What I claim is:

1. A process of making a cereal food which comprises grinding an uncooked grain to produce a meal composed of relatively fine granules, such product being in a condition substantially coarser than ordinary flour, and then roasting and baking this meal while stirring, at a temperature sufficient to form a product composed essentially of well defined small granules of a golden brown color, the granules being easily friable.

2. A process of manufacturing a cereal food product which consists in grinding corn in its raw untreated state, so as to produce a meal composed of a large number of relatively fine, clearly defined granules but not reduced to a pulverulent mass, treating the meal thus produced by first heating the same alone to a temperature below 212 degrees F. until the same is substantially dry and thereafter heating to a temperature of about 280 degrees to 290 degrees F. until the product assumes a golden brown color and stirring the mass during the entire heating operation so as to produce a readily friable, thoroughly cooked cereal food of a golden brown color.

3. A cooked food composed of relatively small unpulverized granules of thoroughly cooked grain meal, baked to a golden brown color, the product being readily digestible and containing dextrin.

In testimony whereof I affix my signature in presence of two witnesses.

Mrs. MARTHA R. KELLY.

Witnesses:
Mrs. S. R. ANDERSON,
VERNA J. KELLY.